(12) United States Patent
Abbey

(10) Patent No.: US 6,313,257 B1
(45) Date of Patent: Nov. 6, 2001

(54) POLY (MERCAPTOPROPYLARYL) CURATIVES

(75) Inventor: Kirk J. Abbey, Raleigh, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/275,059

(22) Filed: Mar. 23, 1999

(51) Int. Cl.[7] .................. C07C 323/18; C07C 321/22; C07C 321/24; C08G 59/50; C08G 59/60

(52) U.S. Cl. .................. 528/109; 252/182.17; 522/56; 525/212; 525/523; 525/535; 568/62

(58) Field of Search .................. 525/118, 212, 525/523, 535, 194, 227; 528/109; 568/62; 252/182.17; 522/56

(56) References Cited

U.S. PATENT DOCUMENTS

| | | | |
|---|---|---|---|
| 2,986,582 | * 5/1961 | Martin et al. | 525/523 X |
| 3,030,247 | 4/1962 | Schurb . | |
| 3,310,527 | 3/1967 | De Acetis et al. . | |
| 3,386,955 | 6/1968 | Nawakowski et al. . | |
| 3,625,925 | 12/1971 | Oswald et al. . | |
| 3,626,031 | * 12/1971 | Chambers et al. | 525/194 X |
| 3,677,978 | 7/1972 | Dowbenko et al. . | |
| 3,678,007 | 7/1972 | Dowbenko et al. . | |
| 3,686,326 | 8/1972 | Oswald et al. . | |
| 4,126,505 | * 11/1978 | Garnish et al. | 525/523 X |
| 4,223,115 | 9/1980 | Zalucha et al. | 525/455 |
| 4,238,520 | 12/1980 | Miller et al. | 426/573 |
| 4,383,090 | * 5/1983 | Slocki et al. | 528/109 X |
| 4,436,892 | 3/1984 | Zondler et al. | 528/117 |
| 4,452,944 | 6/1984 | Dawdy | 525/126 |
| 4,467,071 | 8/1984 | Dawdy | 525/112 |
| 4,500,660 | 2/1985 | Minamisawa et al. | 523/428 |
| 4,529,821 | 7/1985 | Stockinger et al. | 564/105 |
| 4,550,203 | 10/1985 | Stockinger et al. | 564/105 |
| 4,587,311 | 5/1986 | Schmid et al. | 525/504 |
| 4,618,712 | 10/1986 | Stockinger et al. | 564/103 |
| 4,623,702 | * 11/1986 | Grieves et al. | 525/523 X |
| 4,689,389 | 8/1987 | Lee et al. | 528/109 |
| 4,694,096 | 9/1987 | Lehmann et al. | 558/251 |
| 4,721,814 | * 1/1988 | Zahir et al. | 568/62 |
| 4,769,419 | 9/1988 | Dawdy | 525/111 |
| 4,783,509 | * 11/1988 | Cavitt et al. | 525/523 X |
| 4,859,761 | 8/1989 | Flury et al. | 525/504 X |
| 5,128,424 | 7/1992 | McGinnis et al. | 525/481 |
| 5,214,098 | 5/1993 | Setiabudi et al. | 525/109 |
| 5,319,024 | 6/1994 | Ishidoya et al. | 525/123 |
| 5,384,196 | 1/1995 | Inoue et al. | 428/411.1 |
| 5,439,977 | * 8/1995 | Yokota et al. | 528/109 X |
| 5,710,211 | * 1/1998 | Sato et al. | 525/212 X |

FOREIGN PATENT DOCUMENTS

| | | |
|---|---|---|
| 306451 | 3/1989 | (EP) . |
| 1192790 | 7/1968 | (GB) . |
| 743212 | 2/1995 | (JP) . |
| 7-242722 | * 9/1995 | (JP) . |
| WO98/58294 | * 12/1998 | (WO) . |

OTHER PUBLICATIONS

Chem. Abstracts: vol. 68, 1968, 104806n, "Thiomethylation Of Naphthols", Rutamov et al., 1968.*

* cited by examiner

Primary Examiner—Richard D. Lovering
(74) Attorney, Agent, or Firm—Miles B. Dearth

(57) ABSTRACT

Polyfunctional mercaptoalkyl-substituted aryl compounds, one and two-part adhesive compositions including the compounds, and methods of making and using the compounds are disclosed. The compounds include one or more aromatic rings, wherein at least one, and in one embodiment, only one aromatic ring is substituted with at least one alkylthio group and at least one oxyalkylthio group, and preferably do not include hydrolyzable linkages. The aromatic nucleus can provide the cured products with higher glass transition temperatures ($T_g$'s) than are available from most commercially available polymercaptans. The adhesive systems include an epoxy resin or other compounds such as terminal olefins which are known to react with thiols (polymerizable material). Preferably, the compounds are used in combination with amine curatives as a two-component curing system for epoxy resins. Such a composition provides a two-stage cure which enables very quick achievement of bonded parts with handleable strength at room temperature or below, or with relatively low bake temperatures. The materials can be used for coatings, adhesives, sealants, potting compounds, and the like.

19 Claims, No Drawings

POLY (MERCAPTOPROPYLARYL) CURATIVES

Poly(mercaptopropylaryl) curatives

The present invention relates to mercapto-containing curing compounds and one and two part epoxy adhesive formulations including the compounds.

BACKGROUND OF THE INVENTION

Epoxy resins are often used as adhesives, especially for adhering metal parts. Epoxy resins are typically one part of two-part adhesive compositions. The epoxy resin and a curing agent are typically mixed immediately prior to use, and cure within a certain amount of time. Many curing agents are nucleophilic compounds, such as amines or thiols, with at least two nucleophilic groups. Amine-based curing agents often have a relatively long cure time at low temperatures. Thiol (mercaptan)-based curing agents tend to react more rapidly, and at lower temperatures, than amine-based curing agents. Accordingly, thiol-based curing agents are preferred for certain applications.

U.S. Pat. No. 3,310,527 to De Acetis discloses certain thiol-based curing agents. These compounds include three or more -RSH groups attached to one or more aromatic rings, where R is alkyl, oxyalkyl or thioalkyl. However, De Acetis does not disclose or suggest how the oxyalkyl or thioalkyl groups would be incorporated onto the aromatic rings.

There is a need for curing agents for epoxy resins which can be easily prepared and which provide a relatively fast cure for epoxy resins. The present application provides such curing agents.

SUMMARY OF THE INVENTION

Polyfunctional mercaptoalkyl-substituted aryl compounds, one and two-part adhesive compositions including the compounds, and methods of making and using the compounds are disclosed.

The compounds include one or more aromatic rings, wherein at least one, and in one embodiment, only one aromatic ring is substituted with one or more alkylthio groups and one or more oxyalkylthio groups. The aromatic rings are preferably phenyl, naphthyl or biphenyl rings, examples of which include novolak resins and polystyrenes, and can optionally be substituted with one or more groups selected from the group consisting of alkyl, aryl, substituted alkyl, substituted aryl, halo, —OH, amine, amide, and alkoxy. The alkyl moiety in the alkylthio and oxyalkylthio groups is a straight, branched or cyclic alkyl group which includes between one and ten carbon atoms, preferably three or more carbon atoms, and the thiol group can be present at any position on the alkyl group.

The compounds do not contain hydrolyzable linkages, as opposed to polymercaptans which include ester linkages. Because of the aromatic nucleus, these materials are capable of providing cured products with higher glass transition temperatures ($T_g$'s) than are available from most commercially available polymercaptans.

The compounds can be included in curing compositions which include one or more of the following optional elements: amine curatives, reinforcing elements, fillers, coupling agents, antioxidants, antioxidants, adhesion promoters, toughening agents, ambient temperature free radical reactive catalyst systems, accelerators/promoters, retardants, thixotropes, pigments, stabilizers, bondline spacers and mixtures thereof.

The compounds or curing compositions can be one part of a two-part adhesive system, where the second part includes an epoxy resin or other compounds such as terminal olefins which are known to react with thiols (polymerizable material), which preferably have a functionality greater than or equal to two, and optionally includes a reactive diluent, solvent, and any of the above optional elements which do not react with the polymerizable material.

In a preferred embodiment, the compounds are used in combination with amine curatives as a two-component curing system for epoxy resins. Since the compounds do not include hydrolyzable linkages, they are compatible with amine curatives. When properly formulated, this type of blended composition can yield a two-stage cure which enables very quick achievement of bonded parts with handleable strength at room temperature or below, or with relatively low bake temperatures (less than 120° C., preferably between 40 and 100° C.). The first reaction which partially cures the material involves the reaction of the resin with the thiol groups, and the second reaction which fixes the material involves reaction with the amine curatives.

De-roping (trimming excess adhesive, i.e., squeeze-out, after an intermediate cure) and other modifications can be made with relative ease after this initial cure. Finally, the part can be subjected to a second cure over a longer period of time or via heating to a higher temperature (i.e., between 100 and 200° C.).

The compounds can be prepared using known chemistry, for example, by directly forming ether linkages with hydroxy groups on an aromatic ring and directly alkylating the aromatic nucleus with a thiol containing moiety or with a group that is readily converted to a thiol group. In a preferred embodiment, the compounds are prepared by subjecting monofunctional phenolic materials to alkylation, oxy-Cope rearrangement, realkylation, and finally, thiolation.

When used as two-part adhesive formulations with epoxy resins, the epoxy resins preferably have a functionality greater than or equal to two. The compounds can also be combined with polyfunctional olefins in the presence of a free radical initiator to induce addition of the mercaptan groups across the olefinic bonds. The compounds can also be combined with polyfunctional acrylates, methacrylates, or other molecules capable of under going Michael additions in combination with the same catalysts useful with the epoxies. They can also be combined with an oxidizer to form a thermosetting composition via the formation of disulfide linkages. In all of these combinations, and others not listed, these materials can be used for coatings, adhesives, sealants, potting compounds, and the like.

When the compounds take part in a two-stage cure, the compositions can be shaped before, during, and after the initial cure, and are fixed in shape following the second cure. Methods for shaping the composition include laser ablation, compression molding, and the like.

DETAILED DESCRIPTION OF THE INVENTION

Polyfunctional mercaptoalkyl-substituted aryl compounds, curing compositions including the compounds, one and two-part adhesive compositions including the compounds or the compositions, and methods of making and using the compounds are disclosed.

Definitions

As used herein, cure is defined as an irreversible change in the properties of a thermosetting polymer by chemical reaction, that is, condensation, ring closure, or addition. Cure may be accomplished by addition of curing (cross-linking) agents with or without heat and pressure. A curing agent (also known as a hardener) is a catalytic or reactive agent that, when added to a polymer, causes polymerization. An example is a free radical polymerization initiator.

I. The Compounds

As used herein, the terms "thiol" and "mercaptan" are used interchangeably. The compounds include one or more aromatic rings, wherein at least one, and in one embodiment, only one aromatic ring is substituted with one or more alkylthio groups and one or more oxyalkylthio groups. The aromatic rings are preferably phenyl, naphthyl or biphenyl rings, examples of which include novolaks and polystyrenes (which preferably include ten or fewer styrene units) and can optionally be substituted with one or more groups selected from the group consisting of alkyl, aryl, substituted alkyl, substituted aryl, halo, —OH, amine, amide, and alkoxy. As used herein, substituted alkyl and substituted aryl mean substituents as listed above with respect to substituents on the aryl ring.

The alkyl moiety in the alkylthio and oxyalkylthio groups is a straight, branched or cyclic alkyl group which includes between one and ten carbon atoms, preferably three or more carbon atoms, and the thiol group can be present at any position on the alkyl group.

The compounds do not contain hydrolyzable linkages, as opposed to polymercaptans which include ester linkages. Because of the aromatic nucleus, these materials are capable of providing cured products with higher glass transition temperatures ($T_g$'s) than are available from most commercially available polymercaptans. Preferably, the glass transition temperature of the materials exceeds about 30° C. when cured.

II. Curing Compositions Including the Compounds

The compounds can be included in curing compositions which are used to cure epoxy resins or other materials known to react with thiol groups (collectively referred to as polymerizable materials). Preferably, the compound is present in a ratio of about 80 to 200 equivalent percent, preferably between 90 and 150 equivalent percent, of the polymerizable material based on the number of thiol groups in the compound and the number of epoxy or other functional groups on the polymerizable material.

The curing compositions can include one or more additional elements, such as amine curatives, reinforcing elements, fillers, coupling agents, antioxidants, antioxidants, adhesion promoters, toughening agents, ambient temperature free radical reactive catalyst systems, accelerators/promoters such as 1,8-diazabicyclo[5.4.0]undec-7-ene (DBU) and imidazole, retardants such as chlorophenol, thixotropes, pigments, stabilizers, bondline spacers and mixtures thereof.

A. Curatives

Amine curing agents are preferably added to the composition to allow for a two stage cure. The thiols provide a first cure which occurs relatively more rapidly and at a lower temperature than the second cure provided by the amine. Preferably, the amine(s) include, on average, greater than two hydrogen atoms active towards the epoxide resin. As long as this condition is met, any amine can in principle be used. The amines can contain one or more primary, secondary or tertiary nitrogen atoms.

Examples of suitable amines are aliphatic, cycloaliphatic, aromatic and heterocyclic amines, such as bis-(4-aminophenyl)-methane, aniline/formaldehyde resins, benzylamine, octylamine, propane-1,3-diamine, 2,2-dimethyl-1,3-propanediamine (neopentanediamine), hexamethylenediamine, diethylenetriamine, bis(3-aminopropyl)-amine, N,N-bis(3-aminopropyl)-methylamine, triethylenetetraamine, tetraethylenepentaamine, pentaethylenehexaamine, 2,2,4-trimethylhexane-1,6-diamine, m-xylylenediamine, 1,2-and 1,4-diaminocyclohexane, bis-(4-aminocyclohexyl)-methane, bis-(4-amino-3-methylcyclohexyl)-methane, 2,2-bis-(4-aminocyclhexyl)propane and 3-aminomethyl-3,5,5-trimethylcyclohexylamine(isophoronediamine), polyaminoimidazolines and polyaminoamides, for example those obtained from aliphatic polyamines and dimerized or trimerized fatty acids. Suitable amines also include the polyoxyalkyleneamines, known as Jeffamines®, made by Hunstman Chemical, for example the Jeffamines® EDR 148, D 230, D 400, or T 403, xylene diamine and bis (aminocyclohexyl) methane. Optional additional curing agents include, for example, polyamines and polyamide curing agents.

Further suitable catalytic agents are also phosphines, tertiary amines, salts thereof, quaternary ammonium salts, phosphonium compounds, and tertiary sulfonium salts. Examples of suitable catalytic agents include benzyldimethylamine, 2,4,6-tris(dimethylaminomethyl)-phenol, N,N-dimethylaminopyridine, tetrapentylammonium phenolate, tetramethylammonium chloride or benzyltributylammonium bromide or chloride; or alkali metal alcoholates, such as Na alcoholates of 2,4-dihydroxy-3-hydroxymethylpentane.

Suitable curing agents also include urea derivatives such as N,N-dimethyl-N'-(3-chloro-4-methylphenyl)-urea (chlorotoluron), N,N-dimethyl-N'-4-(chlorophenyl)-urea (monouron) or N,N-dimethyl-N'-(3,4-dichlorophenyl)- urea (diuron), 2,4-bis-(N'N-dimethylureido)-toluene or 1,4-bis-(N',N'-dimethylureido)-benzene. The use of these compounds is described, for example, in U.S. Pat. No. 4,238,520. The urea derivatives described in British Patent 1,192,790 are, for example, also suitable as curing agents.

Imidazoles, for example imidazole, 2-ethylimidazole, 2-phenylimidazole, 1-methylimidazole, 1-cyanoethyl-2-ethyl-4-methylimidazole or 2-ethyl-4-methylimidazole, are also suitable curing agents.

In one embodiment, curatives known as latent hardeners can be used. These compounds are those compounds which are inert towards the epoxide resin or other polymerizable material below a defined limit temperature of 80° C., but react rapidly with crosslinking of the resin as soon as this limit temperature is exceeded. The limit temperature of the latent hardeners used according to the invention is preferably at least 85° C., especially at least 100° C. Such compounds are well-known and also commercially available.

Examples of suitable latent hardeners are dicyandiamide, cyanoguanidines, for example the compounds described in U.S. Pat. No. 4,859,761 or EP-A 306,451, aromatic amines, for example 4,4'-or 3,3'-diaminodiphenyl-sulfone, or guanidines, for example 1-o-tolybiguanide, or modified polyamines, for example Ancamine®2014 S (Anchor Chemical UK Limited, Manchester).

Suitable latent hardeners are also N-acylimidazoles, for example 1-(2',4',6'-trimethylbenzoyl)-2-phenylimidazole or 1-benzoyl-2-isopropylimidazole. Such compounds are described, for example, in U.S. Pat. Nos. 4,436,892 and 4,587,311 or Japanese Patent 743,212.

Further suitable hardeners are metal salt complexes or imidazoles, such as are described in U.S. Pat. Nos. 3,678,007 or 3,677,978, carboxylic acids hydrazies, for example adipic acid dihydrazide, isophthalic acid dihydrazide or anthranilic acid hydrazide, triazine derivatives, for example 2-phenyl-4,6-diamino-s-triazine (benzoguanamine) or 2-lauryl-4,6-diamino-s-triazine (lauroguanamine) and also melamine and derivatives thereof. The last mentioned compounds are described, for example, in U.S. Pat. No. 3,030,247.

Suitable latent hardeners are also cyanoacetyl compounds, such as are described in U.S. Pat. No. 4,283,520, for example neopentyl glycol bis-cyanoacetate, cyanoacetic acid N-isobutylamide, 1,6-hexamethylene bis-cyanoacetate or 1,4-cyclohexanedimethanol bis-cyanoacetate.

N-Cyanoacylamide compounds, for example N,N'-dicyanoadipic acid diamide are also suitable latent hardeners. Such compounds are described, for example, in U.S. Pat. Nos. 4,529,821, 4,550,203 and 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis-(N,N-dimethyl-carbamide). The preferred latent hardener is dicyandiamide.

B. Reinforcing Elements and Fillers

Suitable reinforcing elements include carbon black and fibers. Examples of fibers which can be used include E-glass, S-glass, Carbon, Boron fibers, etc. Both short and long, strand and woven, continuous and discontinuous forms of fibers may be used. Examples of fillers include silica, fiberglass or other chopped strands, and metal particulates such as aluminium powder or iron powder. Other extenders and fillers include bituminous coal tar, bitumen, textile fibers, glass fibers, boron fibers, mineral silicates, mica, quartz powder, hydrated alumina, bentonites, wollastonite, kaolin, and silica aerogel.

C. Antioxidants

Antioxidants, for example, amine anti-oxidants are typically added. Examples of suitable antioxidants include polymerized 1,2-dihydro-2,2,4-trimethyl quinoline (Agerite resin-D, RT Vanderbilt, Norwalk, Conn.) and substituted diphenyl amines such as Naugard-445 (Uniroyal Chemicals, Middlebury, Conn.). Suitable antioxidants are well known to those of skill in the art.

D. Adhesion Promoters

The adhesive formulation preferably includes between about 0 and 20% by weight of an adhesion promoter. A suitable adhesion promoter is any adhesion promoter known to those of ordinary skill in the art as useful in promoting adhesion in acrylic adhesives, in particular, adhesion of the adhesive to metal surfaces.

Preferred adhesion promoters are phosphorus-containing compounds that enhance metal adhesion and may be any derivative of phosphinic acid, phosphonic acid or phosphoric acid having at least one P—OH group and at least one organic moiety characterized by the presence of an olefinic group, which is preferably terminally located. Examples of suitable phosphorus compounds are disclosed in U.S. Pat. No. 4,223,115, the contents of which are hereby incorporated by reference. Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred.

Representative phosphorus-containing compounds include, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl) phosphate; methyl(2-methacryloyloxyethyl)phosphate; ethyl methacryloyloxyethyl phosphate; methyl acryloyloxyethyl phosphate; ethyl acryloyloxyethyl phosphate; compounds of the above formula wherein $R^1$ is hydrogen or methyl and $R^2$ is propyl, isobutyl, ethylhexyl, halopropyl, haloisobutyl or haloethylhexyl; vinyl phosphonic acid; cyclohexene-3-phosphonic acid; alphahydroxybutene-2phosphonic acid; 1-hydroxy-1-phenylmethane-1,1-diphosphonic acid; 1-hydroxy-1-methyl-1-disphosphonic acid: 1-amino-1phenyl-1,1-diphosphonic acid; 3-amino-1-hydroxypropane-1,1-disphosphonic acid; amino-tris (methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid. The most preferred adhesion promoter is the reaction product of 2-hydroxyethylmethacrylate and phosphorous pentoxide.

E. Toughening Agents

When a toughener (toughening agent) is added, it is preferably present in a concentration of between about 3 and 30% by weight of the adhesive formulation. The toughening agent provides improved impact and shatter resistance to the resultant adhesive and decreases brittleness. The toughener can be, for example, various solid and liquid elastomeric polymeric materials, and in particular liquid olefinic-terminated elastomers as described in U.S. Pat. Nos. 4,223,115; 4,452,944; and 4,769,419, or olefinic urethane reaction products of an isocyanate-functional prepolymer and a hydroxy functional monomer, as described in U.S. Pat. Nos. 4,223,115; 4,452,944; 4,467,071 and 4,769,419, the contents of which are hereby incorporated by reference.

The most preferred toughener is a methacrylate capped hydroxy-terminated butadiene oligomer.

F. Ambient Temperature Reactive Catalyst Systems, Accelerators and Photoinitiators In those embodiments in which the composition includes an olefinic compound, the composition preferably includes an ambient temperature reactive catalyst system and/or an accelerator. The ambient temperature-reactive catalyst systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed.

Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis (tolysulfonmethyl)-benzyl amine; tertiary amines such as diisopropanol-p-toluidine (DIIPT), dimethyl aniline and dimethyl-p-toluidine; and aminealdehyde condensation products, for example, the condensation products of aliphatic aldehydes such as butyraldehyde with primary amines such as aniline or butylamine.

In certain embodiments, it may be advantageous to add a photoinitiator to the adhesive formulation. One such embodiment is where the adhesive formulation includes a photopolymerizable material and is being used to adhere clear plastics and/or glass to a substrate, for example, in the formation of composite lenses.

III. Adhesive Compositions

The thiols and other optional components, and the epoxy or other polymerizable materials, can be packaged in two packages, such that cure is not effected until the contents of the two packages are mixed. Those optional components that do not cure the epoxy resin can be present in the part of the adhesive composition that includes the epoxy resin. The epoxy compound should be kept separate from compounds having acidic moieties, such as phosphorus-containing compounds and methacrylic acid to inhibit premature reaction between these components.

When combined and mixed, the adhesive formulation begins to cure. In addition to the reactive components, the compositions can also include an inert solvent or diluent such as methylene chloride, or butyl benzyl phthalate, including mixtures of such solvents or diluents.

After mixing the individual packages, one or both surfaces to be joined can be coated with the mixed adhesive system and the surfaces are placed in contact with each other.

Epoxy Resins

Any of a variety of monomeric and polymeric compounds or mixtures of compounds having an epoxy equivalency greater than or equal to 2 (i.e., wherein the average number of epoxy groups per molecule is greater than or equal to 2) can be used in formulating the adhesive compositions. Epoxy compounds are well-known. Useful epoxy compounds include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl) propane; polyglycidyl ethers of aliphatic and aromatic polycarboxylic esters, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxy phenyl) ethane, 1,1-bis(4-hydroxy phenyl) isobutane, and 1,5-dihydroxy naphthalene; and novolak resins; and the like and mixtures thereof.

The foregoing epoxy resins may be augmented with modified epoxy resins in the form of epoxy-rubber adducts. Such adducts are well known and include epoxy compounds reacted with liquid or solid butadiene(meth)acrylonitrile copolymers having at least two groups which are reactive with epoxy groups, including, for example, carboxyl, hydroxyl, mercapto, and amino. Such functional elastomeric copolymers having functional groups are well-known articles of commerce and need not be discussed in greater detail herein.

The epoxide compounds can also be derived from mononuclear phenols, for example from resorcinol hydroquinone; or they can be based on polynuclear phenols, for example, bis-(4-hydroxphenyl)-methane, 4,4'-dihydroxybiphenyl, bis-(4-hydroxphenyl)-sulfone, 1,1,2,2-tetrakis-(4-hydroxyphenyl)-ethane, 2,2-bis-(4-hydroxyphenyl)-propane, 2,2-bis-(3,5-dibromo-4-hydroxxyphenyl)-propane and on novolaks obtainable by condensation of aldehydes, such as formaldehyde, acetaldehyde, chloral or furfural, with phenols such as phenol, or with phenols which are substituted in the nucleus by chlorine atoms or $C_1$–$C_9$ alkyl groups, for example 4-chlorophenol, 2-methylphenol or 4-tertbutylphenol, or by condensation with bisphenols as described above.

Cycloaliphatic epoxide resins, for example bis-(2,3-epoxycyclopentyl) ether, 2,3-epoxycyclopentyl glycidyl ether, 1,2-bis(2,3-epoxycyclopentyloxy)-ethane or 3,4-epoxycyclohexylmethyl 3',4'-epoxycyclohexanecarboxylate can also be used.

Epoxide resins can also be used in which the 1,2-epoxide groups are bound to different heteroatoms or functional groups; these compounds include, for example, the N,N,O-triglycidyl derivative of 4-aminophenol, the glycidyl ether/glycidyl ester of salicyclic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

In one embodiment, the epoxy resins include free radical polymerizable groups, such as acrylate and methacrylate groups and terminal olefins. These groups can react with the thiols described herein in a free radical reaction.

Particularly preferred epoxide resins are polyglycidyl ethers of polyhydroxy phenols, for example of 2,2-bis-(4-hydroxyphenyl)-propane (bisphenol A) or bis-(4-hydroxphenyl)-methane (bisphenol F), or of novolaks. The epoxide resins used are preferably liquid, i.e. they are either liquid resins or liquid mixtures of solid and liquid resins.

The most preferred epoxide resins are the diglycidyl ethers of bisphenol A or bisphenol F and novolaks.

Additional and/or Optional Polymerizable Materials

The adhesive compositions can include other polymerizable monomers which are capable of reacting with the thiol compounds via addition of the S—H bound across a double bond. Further, the thiol compounds can participate in Michael reactions with various double bond-containing molecules, for example, acrylates. Acrylates can be preferred for use as reactive diluents.

One-Part Adhesive Formulations

In one embodiment, the compositions are pre-mixed and partially cured, then frozen to stop the curing process before a significant reaction occurs. When thawed, the compositions can be applied and allowed to finish curing. One-part adhesive compositions are useful in electronics, in potting compositions, and for attaching dies. A retardant (typically an acidic compound such as a phenol or a carboxylic acid) may optionally be added to increase the cure time.

IV. Methods of Preparing the Compounds

The compounds can be prepared, for example, by subjecting polyfunctional phenolic materials to alkylation and thiolation reactions. The compounds can also be prepared by subjecting monofunctional phenolic materials to alkylation, oxy-cope rearrangement, realkylation, and finally, thiolation.

A wide variety of polyfunctional mercaptopropyl compounds are readily available from the equally readily available polyfunctional phenolic materials such as bisphenol A, novolaks, and poly(4-hydroxystyrene) by simple alkylation and thiolation. The polyfunctional mercaptopropyl compounds can also be prepared from monofunctional phenolic materials by sequential alkylation, oxy-Cope rearrangement, and realkylation, with the last step being thiolation.

The detailed steps can be accomplished in a number of ways. The alkylation step(s) are attractively performed by a phase transfer catalysis induced step using allyl bromide, but other halide, pseudo-halides, sulfonate esters, and the like, can be used. The oxy-Cope rearrangement can be accomplished thermally at temperatures greater than about 150° C. as is generally taught in the literature. The boron trichloride catalyzed process at room temperature is quite desirable for laboratory syntheses, but may not be sufficiently economical for commercial production. Other Lewis acid catalysts may be found to promote this reaction.

The thiolation can be readily accomplished via a photochemical reaction using ketones as solvents and as photoinitiators with thiolacetic acid, or other thiolcarboxylic acids. Additionally, thiourea can be used instead, but the final generation of the free mercaptan may require alternative steps to the transesterification process given in the examples below. The reaction can also be induced thermally by the addition of suitable free radical initiators. Other means for introducing a thiol group include adding hydrogen sulfide across a double bond, reacting sodium thiolate with halides or other leaving groups, and other known reactions.

V. Methods of Curing the Thermosetting Resin Compositions

The thermosetting resin compositions can be subjected to a first reaction which partially cures the material (for example, at a temperature of between −40 and 40° C. for between 1 and 10 minutes) and then to a second reaction, for example, by subjecting the compound to an elevated temperature, which fixes the material in whatever shape it is in during the polymerization reaction.

The hardening of the mixtures is preferably carried out in the temperature range from about 100° C.–200° C. The hardening reaction with the amine/thiol hardener is complete after, for example, about 0.1 to 5 minutes at 100°–120° C., and a storage-stable, non-critical B stage system is obtained which shows excellent flexibility and tackiness. The complete crosslinking with shaping is preferably carried out at about 100°–180° C. for between about 1.1 to 15 minutes.

VI. Methods of Shaping the Composition

The composition can optionally be shaped before, during, and after the first reaction, but is fixed in shape following the second reaction. Methods for shaping the composition include laser ablation, compression molding, extrusion, three dimensional printing techniques, and the like.

VII. Methods of Using the Composition

The composition can be used as an adhesive, as a filler to fill hollow voids, as a rubber, as an impression material, as potting compounds, and also to prepare articles of manufacture which typically include thermosetting resins. It is preferred for use in adhering metal parts or substrates.

The compositions can be especially suitable as impregnating resins for the production of fiber composite materials. The invention therefore also relates to fiber composite materials impregnated with a mixture according to the invention, to prepregs obtainable by impregnating a fabric with a mixture and subsequent heating of the impregnated fabric until the reaction of the epoxide resin (a) with the amine (c) and the thiol (d) is complete, without simultaneous onset of the reaction of the epoxide resin (a) with the latent hardener (b), and also to the laminates obtainable by complete hardening of the prepregs.

VIII. Surfaces Which Can Be Adhered

The adhesive systems can be used to bond metal surfaces, such as steel, aluminum and copper, to a variety of substrates, including metal, plastics, and other polymers, reinforced plastics, fibers, glass, ceramics, wood and the like.

The metals which are preferred for bonding include zinc, copper, cadmium, iron, tin, aluminum, silver, chromium, alloys of such metals, and metallic coatings or platings of such metals such as galvanized steel including hot dipped electrogalvoneal steel and galvoneal steel.

The adhesive compositions bond metal substrates with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems can provide effective bonding at room temperature, for example, when amine curatives are not used. Heat is not required either for applying the adhesive systems to the substrates or for curing the adhesives, so long as the temperature exceeds the glass transition temperature of the cured material by at least about 10° C.

Although the adhesives are preferred for bonding metal surfaces, the adhesive formulations may be applied as an adhesive, primer or coating to any surface or substrate capable of receiving the adhesive.

IX. Methods for Applying the Adhesive Formulation

The adhesive coatings may be brushed, rolled, sprayed, dotted, knifed or otherwise applied to one substrate, preferably to both substrates, to a desired thickness. Preferably, this thickness does not exceed 60 mils.

The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween.

The smoothness of the surfaces and their clearance (e.g., in the case of nuts and bolts) will determine the required film thickness for optimum bonding. The two metal surfaces and the interposed adhesive composition are maintained in engagement until the the adhesive composition has cured sufficiently to bond the the surfaces.

The present invention will be better understood with reference to the following non-limiting examples.

EXAMPLE 1

Synthesis of 4,4'-Isopropylidenediphenylallyl ether (1)

To a 2 L Morton flask with an overhead mixer was added 100.0 g (0.438 mole, 1.0 eq.) of bisphenol A and 9.18 g (0.0219 mole, 0.05 eq.) of tetraphenylphosphonium bromide in 1 L of methylene chloride. To this solution was added 127.2 g of allyl bromide (1.05 mole, 2.4 eq.) and 35.0 g of NaOH (0.876 mole, 2.0 eq.) dissolved in 1 L of de-ionized water. The reaction was stirred vigorously under nitrogen overnight. The product was extracted with methylene chloride, stripped of solvent, filtered through basic alumina, and characterized by proton NMR. Obtained a 94% yield of (1) with a 95% purity.

EXAMPLE 2

Synthesis of 4,4'-isopropylidenediphenyl propyl-3-thiol ether (2)

4,4'-Isopropylidenediphenylallyl ether (126.0 g) in 800 ml of MeOH bubbled with $N_2$ to remove oxygen. The 1 liter photoreactor was run for fourteen hours using 0.5 mole % of benzophenone (0.37 g, 0.0020 mole) as photoinitiator for a 90% yield. The thiol ester (3) was then converted to the corresponding mercaptan (2) by transesterification using 0.1 N HCL in MeOH under reflux. Although progress was noted, no final yield was obtained due to apparent impurities which caused a two phase system to result in the reaction flask.

EXAMPLE 3

Synthesis of Polyallyl ether poly(4-hydroxystyrene) (4)

The poly(4-hydroxystyrene) used was obtained from Maruzen Petrochemical, Maruka Lyncur M(S-2). In a 2 L, 3-neck round bottom flask equipped with an overheard stirrer was weighed 200 g (1.66 eq.) of the poly(4-hydroxystyrene). One liter of methylene chloride was added. Then 241.96 g (2.0 eq.) of allyl bromide and 34.9 g (0.003 eq) of tetraphenylphosphonium bromide were added. This mixture was stirred to dissolve everything, but was still somewhat lumpy when the following steps were taken. Sodium hydroxide (66.4 g, 1.66 eq.) were dissolved in 250 ml of distilled water. To the reaction mixture was added 500 ml of distilled water. The NaOH solution was then added slowly in portions to the reaction mixture. An additional 250 ml of distilled water as added at the end. The mixture was stirred overnight. After 24 hours, a proton NMR spectrum of a sample of the product appeared to show complete reaction. The methylene chloride layer was removed and the aqueous layer washed with an aliquot of fresh methylene chloride. The methylene chloride solutions were passed through a bed of activated alumina. After removal of the methylene chloride on a rotary evaporator, the crude product was dissolved in THF. The tetraphenylphosphonium bromide phase transfer catalyst was insoluble in this medium and was removed by filtering the THF solution through a second bed of alumina. Removal of the THF by rotary evaporation under reduced pressure yielded a solid product (4) that appears by NMR to be free of the tetraphenylphosphonium bromide phase transfer catalyst.

EXAMPLE 4

Synthesis of Poly(4-(3-(S-acetyl)thiolpropoxy) styrene) (5)

A portion of the polyallyl ether poly(4-hydroxystyrene) (4) (107.132 g; 0.67 eq.) was dissolved in 500 ml of acetone. To this was added 50.23 g (0.66 eq.) of thiolacetic acid. This was charged to a 1 L photoreactor and after complete assembly, the remaining head space was filled with more acetone. The reaction medium was then flushed with dry nitrogen gas. Cool tap water was circulated through the jacket of the quartz housing of the mercury vapor lamp. A condenser was attached with −10° C. coolant to reduce the loss of acetone. The nitrogen gas exiting the reactor was passed through first a scrubber containing bleach and then to a scrubber containing activated carbon. The mixture was then irradiated for 5.5 hours. After standing overnight without any further radiation, NMR showed 90% consumption of the olefin groups. The acetone solvent was removed by rotary evaporation under reduced pressure. The dry product (5) was isolated in essentially quantitative yield.

EXAMPLE 6

Synthesis of Poly(4-(3-mercaptopropoxy)styrene) (6)

In a 3 L, 3-necked round bottom flask was weighed 150 g of (5). The polymer was dissolved in 750 g of toluene. To this solution was added 115 g of 10% hydrogen chloride in methanol and 300 g of absolute ethanol. A fractionating distillation head was attached. The reactor was purged with dry nitrogen gas. External heating was applied with a 90° C. oil bath resulting in an internal temperature of ~70° C. After heating for 5 hours, an NMR spectrum showed about 73% removal of the acetyl groups. A further period of heating for 8 hours led to about 99% removal of the acetyl groups. The reaction mixture was cooled, then passed through a column of activated, basic alumina. The solvent was removed by rotary evaporation under reduced pressure to give 130 g of (6). The polymer was dissolved in fresh toluene and precipitated by adding hexane to yield 85 g of purified product.

EXAMPLE 7

Synthesis of 2,2'-o-Diallyl-4,4'-isopropylidenediphenylallyl ether (7)

4,4'-Isopropylidenediphenylallyl ether (1) (15.4 g, 0.05 mole) was dissolved in methylene chloride and placed in an additional funnel. This solution was added dropwise to 100 ml of $BCl_3$ (1.0 M in $CH_2Cl_2$, 11.7 g of $BCl_3$, 2 eq.) The initial yellow color proceeded to change to an emerald green as the reaction stirred under nitrogen. The next day, isopropanol was slowly added to quench the excess $BCl_3$. De-ionized water was added and the mixture continued to stir for 30 minutes. The 2,2'-o-diallylisopropylidenediphenol (8) was extracted with $CH_2Cl_2$ and concentrated by a rotary evaporator to a green liquid (97% yield). The proton NMR (40) was consistent with the expected structure. The next step combined 15.0 g of (8) (0.0486 mole, 1 eq.) with 2.0 eq. of NaOH, 0.05 eq. of phase transfer catalyst as in (1) ad 2.4 eq. of allyl bromide. The two phase system was run overnight and worked up to give a 95% yield (7).

EXAMPLE 8

Synthesis of 2,2', 6,6'-o-Tetraallyl-4,4'-isopropylidenediphenylallyl ether (9)

Another oxy-Cope reaction was run using $BCl_3$ (2.1 eq.) as the Lewis acid and 18.0 g (0.46 mole, 1 eq.) of the tetra functional allyl (7) (7634–41) for a 94% yield of 2,2',6,6' tetraallyl isopropylidenediphenol (10). Continuing to the next step, a third phase transfer reaction used (10) as the starting material and gave a 94% yield of the hexafunctional allyl (9).

The compositions can be prepared in the conventional manner by mixing the components by means of known mixing equipment (stirrers, rollers).

The mixtures according to the invention can be used, for example, as adhesives (adhesive films, hot melts, pastes, one-component adhesives, patches), matrix resins, surface coatings, sealing compounds or injection compounds, or quite generally for the manufacture of hardened products. They can be used in each case in a formulation adapted to the specific field of application, in the unfilled or filled state, for example as sealing compounds, paints, coating composititions, finishes, dipping resins, casting resins and especially as impregnatives.

The invention thereof also relates to crosslinked products which are obtaininable by hardening the mixtures according to the invention.

I claim:

1. A compound including one or more aromatic rings substituted with one or more alkylthio groups and one or more oxyalkylthio groups, wherein the one or more aromatic rings are selected from phenyl, naphthyl or biphenyl ring, the alkyl group is a straight, branched or cyclic alkyl group which includes between three and ten carbon atoms, and the thiol group is present at any position on the alkyl group, wherein the aromatic ring is optionally substituted with one or more groups selected from the group consisting of alkyl, aryl, substituted alkyl, substituted aryl, halo, —OH, amine, amide, alkoxy, and acyl.

2. The compound of claim 1 wherein the compound includes only one alkylthio group.

3. The compound of claim 1 wherein the compound includes only one oxyalkylthio group.

4. The compound of claim 1 wherein the one or more aromatic rings are part of a polystyrene or novolak resin.

5. The compound of claim 1 wherein only one of the one or more aromatic rings is substituted with one or more alkylthio groups and one or more oxyalkylthio groups.

6. A compound including one or more aromatic rings substituted with one or more alkylthio groups and one or more oxyalkylthio groups, wherein the one or more aromatic rings are selected from phenyl, naphthyl or biphenyl ring, the alkyl group is a propyl group, and the thiol group is present at any position on the alkyl group, wherein the aromatic ring is optionally substituted with one or more groups selected from the group consisting of alkyl, aryl, substituted alkyl, substituted aryl, halo, —OH, amine, amide, alkoxy, and acyl.

7. The compound of claim 6 wherein the compound includes only one alkylthio group.

8. The compound of claim 6 wherein the compound includes only one oxyalkylthio group.

9. The compound of claim 6 wherein only one of the one or more aromatic rings is substituted with one or more alkylthio groups and one or more oxyalkylthio groups.

10. A compound including one or more aromatic rings substituted with one or more alkylthio groups and one or more oxyalkylthio groups, wherein the one or more aromatic rings are selected from phenyl, napthyl or biphenyl ring and are part of a polystyrene or novolak resin, the alkyl group is a straight, branched or cyclic alkyl group which includes between one and ten carbon atoms, and the thiol group is present at any position on the alkyl group, wherein the aromatic ring is optionally substituted with one or more groups selected from the group consisting of alkyl, aryl, substituted alkyl, substituted aryl, halo, —OH, amine, amide, alkoxy, and acyl.

11. A composition for curing epoxy resins comprising a mixture of a compound including one or more aromatic rings substituted with one or more alkylthio groups and one or more oxyalkylthio groups, wherein the one or more aromatic rings are selected from phenyl, naphthyl or biphenyl ring, the alkyl group is a straight, branched or cyclic alkyl group which includes between one and ten carbon atoms, and the thiol group is present at any position on the alkyl group, wherein the aromatic ring is optionally substituted with one or more groups selected from the group consisting of alkyl, aryl, substituted alkyl, substituted aryl, halo, —OH, amine, amide, alkoxy, and acyl, and a compound or mixture of compounds comprising, on average, greater than two active amine and/or thio hydrogens.

12. A frozen one-part adhesive composition comprising:

a) a first part comprising the composition of claim 11 and b) a second part comprising an epoxy resin and/or an olefin, wherein the composition is frozen after the two parts are mixed to form a partially reacted, reactive composition that finishes its cure when warmed.

13. The composition of claim 12 further comprising a retardant.

14. A two-part adhesive composition comprising:

a) a first part comprising a compound including one or more aromatic rings substituted with one or more alkylthio groups and one or more oxyalkylthio groups, wherein the one or more aromatic rings are selected from phenyl, naphthyl or biphenyl ring, the alkyl group is a straight, branched or cyclic alkyl group which includes between one and ten carbon atoms, and the thiol group is present at any position on the alkyl group, wherein the aromatic ring is optionally substituted with one or more groups selected from the group consisting of alkyl, aryl, substituted alkyl, substituted aryl, halo, —OH, amine, amide, alkoxy, and acyl and b) a second part comprising an epoxy resin or an olefin with a functionality greater than or equal to two.

15. The adhesive composition of claim 14 wherein the first part further comprises a compound or mixtures of compounds comprising, on average, greater than two active amine and/or thio hydrogens.

16. The adhesive composition of claim 14 wherein the epoxy resin is a bisphenol or novolak resin.

17. The adhesive composition of claim 14, wherein the olefin is an acrylate or methacrylate.

18. The adhesive composition of claim 14, further comprising an adhesion promoter.

19. The adhesive composition of claim 14, further comprising one or more additional components selected from the group consisting of amine curatives, reinforcing elements, fillers, coupling agents, antioxidants, toughening agents, ambient temperature free radical reactive catalyst systems, accelerators/promoters, retardants, thixotropes, pigments, stabilizers, bondline spacers and mixtures thereof.

* * * * *